(12) United States Patent
Fukasawa et al.

(10) Patent No.: US 11,980,793 B2
(45) Date of Patent: May 14, 2024

(54) GOLF BALL MATERIAL AND GOLF BALL

(71) Applicant: BRIDGESTONE SPORTS CO., LTD., Tokyo (JP)

(72) Inventors: Shuto Fukasawa, Saitamaken (JP); Atsushi Namba, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 161 days.

(21) Appl. No.: 17/715,100

(22) Filed: Apr. 7, 2022

(65) Prior Publication Data

US 2022/0331668 A1 Oct. 20, 2022

(30) Foreign Application Priority Data

Apr. 19, 2021 (JP) ................................ 2021-070462

(51) Int. Cl.
| | |
|---|---|
| *A63B 37/06* | (2006.01) |
| *A63B 37/00* | (2006.01) |
| *C08L 33/08* | (2006.01) |
| *C08L 53/02* | (2006.01) |

(52) U.S. Cl.
CPC ........ *A63B 37/0024* (2013.01); *A63B 37/005* (2013.01); *C08L 33/08* (2013.01); *C08L 53/02* (2013.01)

(58) Field of Classification Search
CPC .................. A63B 37/0023; A63B 37/0024
See application file for complete search history.

(56) References Cited

U.S. PATENT DOCUMENTS

| | | | |
|---|---|---|---|
| 6,663,510 B1 | 12/2003 | Iwami et al. | |
| 2001/0031670 A1 | 10/2001 | Iwami et al. | |
| 2002/0013421 A1 | 1/2002 | Takesue et al. | |
| 2003/0073517 A1* | 4/2003 | Ichikawa | A63B 37/0003 473/378 |
| 2005/0119399 A1* | 6/2005 | Nishioka | C08L 21/00 524/502 |
| 2005/0256269 A1 | 11/2005 | Takesue et al. | |

(Continued)

FOREIGN PATENT DOCUMENTS

| | | |
|---|---|---|
| JP | 2001-095948 A | 4/2001 |
| JP | 2001-120686 A | 5/2001 |

(Continued)

*Primary Examiner* — Raeann Gorden
(74) *Attorney, Agent, or Firm* — Sughrue Mion, PLLC

(57) ABSTRACT

A golf ball material contains
(I) a multi-component copolymer having conjugated diene units, non-conjugated olefin units and aromatic vinyl units; and
(II) a binary copolymer of an olefin and an α,β-unsaturated carboxylic acid of 3 to 8 carbons and/or a ternary copolymer of an olefin, an α,β-unsaturated carboxylic acid of 3 to 8 carbons and an ester of the α,β-unsaturated carboxylic acid, or a metal neutralization product thereof.
The conjugated diene units include butadiene units, the non-conjugated olefin units include units selected from the group consisting of ethylene, propylene and 1-butene units, and the aromatic vinyl units include styrene units. The content of the conjugated diene units in the multi-component copolymer (I) is 5 wt % or more. This golf ball material is soft and has an excellent rebound resilience. Golf balls which use this material in the cover provide golfers with a competitive edge.

8 Claims, 1 Drawing Sheet

(56) References Cited

U.S. PATENT DOCUMENTS

| | | | | |
|---|---|---|---|---|
| 2015/0258387 A1* | 9/2015 | Hwang | ............. | A63B 37/0033 |
| | | | | 473/376 |
| 2018/0282456 A1* | 10/2018 | Horikawa | ............. | C08F 297/06 |
| 2018/0291185 A1 | 10/2018 | Horikawa et al. | | |
| 2022/0379172 A1* | 12/2022 | Mizuno | .................... | B29B 7/90 |

FOREIGN PATENT DOCUMENTS

| JP | 2001-327631 A | 11/2001 |
|---|---|---|
| JP | 2001-348467 A | 12/2001 |
| JP | 6780827 B2 | 11/2020 |

\* cited by examiner

GOLF BALL MATERIAL AND GOLF BALL

CROSS-REFERENCE TO RELATED APPLICATION

This non-provisional application claims priority under 35 U.S.C. § 119(a) on Patent Application No. 2021-070462 filed in Japan on Apr. 19, 2021, the entire contents of which are hereby incorporated by reference.

TECHNICAL FIELD

The present invention relates to a golf ball material and to a golf ball which uses this material. More specifically, the invention relates to a golf ball material that can be suitably used as the material making up a cover layer (intermediate layer or outermost layer) in a golf ball having a core encased by a cover of one, two or more layers, and to a golf ball using such a material.

BACKGROUND ART

In order to achieve golf balls endowed with both a soft feel at impact and a high rebound, materials prepared by the addition of a hydrogenated aromatic vinyl elastomer such as a styrene-ethylene-butylene-styrene block copolymer (SEBS) to an ionomer resin have been described. Resin compositions obtained by blending a thermoplastic elastomer such as SEBS and a tackifier in an ionomer resin are disclosed in, for example, JP-A 2001-95948 and JP-A 2001-327631.

When SEBS is added to an ionomer resin, a soft feel can be imparted, but the addition of a large amount of SEBS has the undesirable effect of lowering the rebound.

Also, materials in which the acid in an ionomer resin composition is completely neutralized by adding a fatty acid to the ionomer resin composition have been disclosed as golf ball materials. For example, highly neutralized ionomer resin materials obtained by blending a fatty acid and a basic inorganic metal compound in an ionomer resin composition are described in JP-A 2001-120686 and JP-A 2001-348467.

However, although such highly neutralized ionomer resin materials do exhibit a high rebound, a sufficiently soft feel is not achieved.

SUMMARY OF THE INVENTION

It is therefore an object of the present invention to provide a golf ball material that is soft and has an excellent rebound resilience. Another object of the invention is to provide a golf ball made using such a material.

As a result of intensive investigations, we have discovered that by having the golf ball material be a multi-component copolymer in which an acid-containing copolymer that includes an olefin and an α,β-unsaturated carboxylic acid and a metal salt thereof, such as an ionomer resin, serves as the base resin, and which has conjugated diene units, non-conjugated olefin units and aromatic vinyl units, and by specifying the multi-component copolymer such that the conjugated diene units include butadiene units, the non-conjugated olefin units include units selected from the group consisting of ethylene units, propylene units and 1-butene units, the aromatic vinyl units include styrene units, and the content of the conjugated diene units in the multi-component polymer is 5 wt % or more, the golf ball material, in spite of having a low hardness, can maintain an unexpectedly high rebound resilience. When this material is used in the cover to create a golf ball, it fully imparts a soft feel to the ball while at the same time having an excellent rebound resilience that enables the ball to achieve a high flight performance.

Accordingly, in a first aspect, the invention provides a golf ball material that includes:
(I) a multi-component copolymer having conjugated diene units, non-conjugated olefin units and aromatic vinyl units; and
(II) a binary copolymer of an olefin and an α,β-unsaturated carboxylic acid of 3 to 8 carbon atoms and/or a ternary copolymer of an olefin, an α,β-unsaturated carboxylic acid of 3 to 8 carbon atoms and an ester of the α,β-unsaturated carboxylic acid, or a metal neutralization product thereof,
wherein the conjugated diene units include butadiene units, the non-conjugated olefin units include units selected from the group consisting of ethylene, propylene and 1-butene units, the aromatic vinyl units include styrene units, and the content of the conjugated diene units in the multi-component copolymer (I) is 5 wt % or more.

In a preferred embodiment of the golf ball material of the invention, the content of the conjugated diene units in the multi-component copolymer (I) is 10 wt % or more.

In another preferred embodiment of the inventive golf ball material, the content of the non-conjugated olefin units in the multi-component copolymer (I) is 90 wt % or less.

In yet another preferred embodiment, the content of the aromatic vinyl units in the multi-component copolymer (I) is 30 wt % or less.

In still another preferred embodiment, the non-conjugated olefin units are ethylene units.

In a further preferred embodiment, the multi-component copolymer (I) is a copolymer polymerized with a gadolinium metallocene complex catalyst.

In a yet further preferred embodiment, the content of component (II) relative to the combined amount of components (I) and (II) is from 5 to 95 wt %.

In a still further preferred embodiment, the material has a hardness on the Shore D scale of from 25 to 65.

The golf ball material of the invention is preferably a golf ball cover material.

In a second aspect, the invention provides a golf ball having a core of one or more layer and a cover of one or more layer encasing the core, wherein at least one layer of the cover is formed of the golf ball material of the invention.

ADVANTAGEOUS EFFECTS OF THE INVENTION

The golf ball material of the invention is soft and has an excellent rebound resilience. Golf balls which use this material in the cover provide golfers with a competitive edge.

BRIEF DESCRIPTION OF THE DIAGRAMS

DESCRIPTION OF THE PREFERRED EMBODIMENTS

Figure 1:
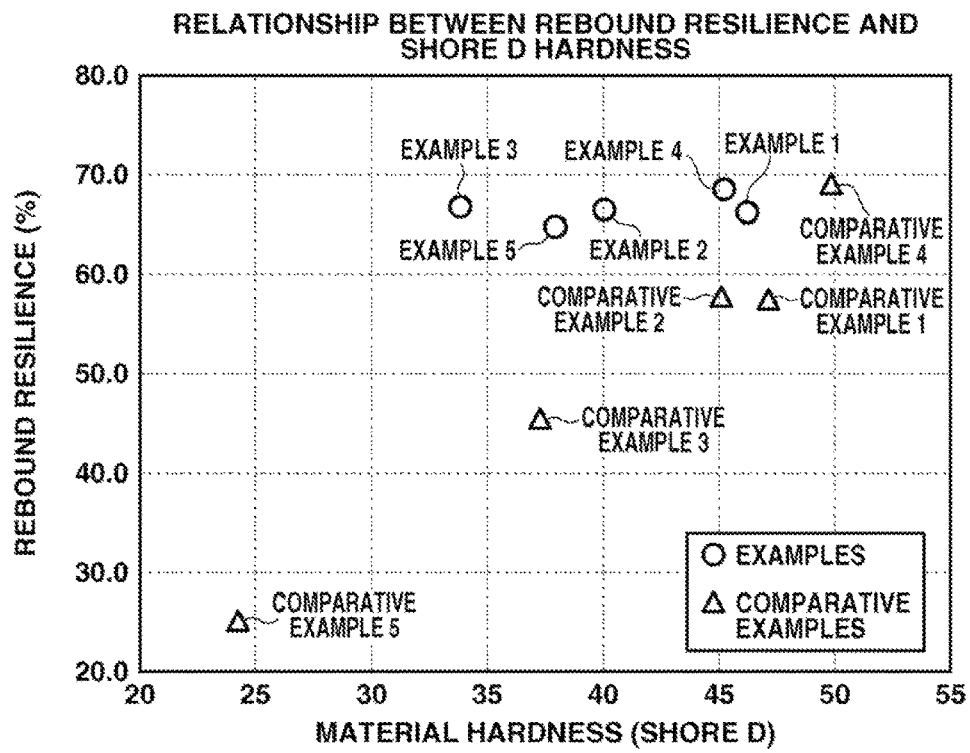
FIG. 1 is a graph showing the relationship between the material hardness and the rebound resilience of the cover in Examples 1 to 5 and Comparative Examples 1 to 5.

The objects, features and advantages of the invention will become more apparent from the following detailed description taken in conjunction with the appended diagrams.

The golf ball material of the invention is characterized by including components (I) and (II) below:
- (I) a multi-component copolymer having conjugated diene units, non-conjugated olefin units and aromatic vinyl units; and
- (II) a binary copolymer of an olefin and an α,β-unsaturated carboxylic acid of 3 to 8 carbon atoms and/or a ternary copolymer of an olefin, an α,β-unsaturated carboxylic acid of 3 to 8 carbon atoms and an ester of the α,β-unsaturated carboxylic acid, or a metal neutralization product thereof.

Component (I) is a multi-component copolymer having conjugated diene units, non-conjugated olefin units and aromatic units. This multi-component copolymer is the multi-component copolymer disclosed in JP No. 6780827, and is described below.

Conjugated Diene Units

The multi-component copolymer includes conjugated diene units. The conjugated diene units are structural units from a conjugated diene compound serving as a monomer. Because the multi-component copolymer can be polymerized using a conjugated diene compound as the monomer, compared with copolymers obtained by polymerization using a known non-conjugated diene compound such as EPDM, it has excellent crosslinking properties. The conjugated diene compound includes a butadiene unit. The butadiene unit is a structural unit from a butadiene compound. Specific examples of the butadiene compound include 1,3-butadiene, isoprene, 1,3-pentadiene and 2,3-dimethyl-1,3-butadiene. The conjugated diene units in the multi-component copolymer preferably include 1,3-butadiene units, and more preferably consist solely of 1,3-butadiene units.

The multi-component copolymer has a cis-1,4 bond content in the overall conjugated diene units that is preferably at least 50%, more preferably at least 70%, even more preferably at least 80%, and still more preferably at least 90%. Such a multi-component copolymer having a high cis-1,4 bond content in the overall conjugated diene units can be obtained by using as the monomers a conjugated diene compound, a non-conjugated olefin compound and an aromatic vinyl compound. The content of vinyl bonds (1,2-vinyl bonds, 3,4-vinyl bonds, etc.) in the conjugated diene units overall is preferably 30% or less, more preferably 15% or less, even more preferably 10% or less, and still more preferably 6% or less. Also, the trans-1,4 bond content in the overall conjugated diene units is preferably 30% or less, more preferably 15% or less, and even more preferably 10% or less. The respective contents of cis-1,4 bonds, trans-1,4 bonds and vinyl bonds can be determined by the integrated area ratios from $^1$H-NMR and $^{13}$C-NMR measurement results.

The conjugated diene compound may be of one type used alone or two or more types may be used together. That is, the multi-component copolymer may include one type of conjugated diene unit alone or may include two or more types. The content of conjugated diene units is preferably at least 10 wt %, and even more preferably at least 15 wt %, of the overall multi-component copolymer. The content of conjugated diene units is preferably 80 wt % or less, more preferably 60 wt % or less, and even more preferably 50 wt % or less, of the overall multi-component copolymer.

Non-Conjugated Olefin Units

The multi-component copolymer includes non-conjugated olefin units. The non-conjugated olefin units are structural units from a non-conjugated olefin compound serving as a monomer. The non-conjugated olefin compound is selected from the group consisting of ethylene, propylene and 1-butene. In particular, to fully impart the golf ball material with rebound resilience and softness, it is preferable for the non-conjugated olefin units to be ethylene units.

The non-conjugated olefin compound may be of one type used alone, or two or more types may be used together. That is, the multi-component copolymer may contain one type of non-conjugated olefin unit, or may contain two or more types. The content of non-conjugated olefin units is preferably more than 20 wt % and less than 90 wt % of the overall multi-component copolymer, and is more preferably from 30 to 85 wt %, even more preferably from 40 to 80 wt %, and most preferably from 45 to 75 wt %.

Aromatic Vinyl Units

The multi-component copolymer includes aromatic vinyl units. The aromatic vinyl units are structural units from an aromatic vinyl compound serving as a monomer. Specific examples of aromatic vinyl compounds include styrene, o-methylstyrene, m-methylstyrene, p-methylstyrene, o,p-dimethylstyrene, o-ethylstyrene, m-ethylstyrene and p-ethylstyrene. The aromatic vinyl units in the multi-component copolymer include styrene units, and preferably consist only of styrene units. The aromatic rings in the aromatic vinyl units, unless bonded to a neighboring unit, are not included on the copolymer main chain.

The aromatic vinyl compound may be of one type used alone, or two or more types may be used together. That is, the multi-component copolymer may contain one type of aromatic vinyl unit, or may contain two or more types. It is preferable for the content of aromatic vinyl units to be from 3 to 30 wt % of the overall multi-component copolymer. At an aromatic vinyl unit content of less than 3 wt % or more than 30 wt %, the lengths of the non-conjugated olefin moieties on the copolymer cannot be controlled, and so an improvement in durability due to non-conjugated olefin crystals is not achieved. The aromatic vinyl unit content is preferably from 3 to 30 wt %, more preferably from 5 to 25 wt %, and even more preferably from 10 to 20 wt %, of the overall multi-component copolymer.

The number of types of monomers in the multi-component copolymer is not particularly limited, provided that the multi-component copolymer includes conjugated diene units, non-conjugated olefin units and aromatic vinyl units. The multi-component copolymer may also include constituent units other than conjugated diene units, non-conjugated olefin units and aromatic vinyl units. The content of such other constituent units, from the standpoint of obtaining the desired effects, is preferably not more than 30 wt %, more preferably not more than 20 wt %, and even more preferably not more than 10 wt %, of the overall multi-component copolymer. The absence of any such other constituent units, that is, a content of 0 wt %, is especially preferred.

The multi-component copolymer is, at the very least, a multi-component copolymer having one type of conjugated diene unit, one type of non-conjugated olefin unit and one type of aromatic vinyl unit. Also, from the standpoint of imparting good failure characteristics, the multi-component copolymer is preferably a polymer obtained by polymerization using as the monomers at least one type of conjugated diene compound, one type of non-conjugated olefin compound and one type of aromatic vinyl compound.

The multi-component copolymer is more preferably a ternary copolymer consisting entirely of one type of conjugated diene unit, one type of non-conjugated olefin unit and one type of aromatic vinyl unit, and is even more preferably a ternary copolymer consisting entirely of 1,3-butadiene units, ethylene units and styrene units. Here, "one type of conjugated diene unit" encompasses conjugated diene units of differing bonding modes.

One major feature of the multi-component copolymer is that it contains conjugated diene units, non-conjugated olefin units and aromatic vinyl units and that the main chain consists entirely of acyclic structures. When the main chain has cyclic structures, the failure characteristics (especially the elongation at break) decrease. NMR spectroscopy may be used as the chief measurement means for ascertaining whether the main chain of the multi-component copolymer has cyclic structures. Specifically, when peaks attributable to cyclic structures present on the main chain (e.g., in the case of three-membered rings to five-member rings, peaks appearing at 10 to 24 ppm) are not observed, this indicates that the main chain of the multi-component copolymer consists solely of acyclic structures. The multi-component copolymer, as described below in the method of preparation therefor, may be synthesized in a single reactor, i.e., by one-pot synthesis, and thus can be prepared by a simplified process.

The multi-component copolymer has a polystyrene-equivalent weight-average molecular weight (Mw) of preferably from 10,000 to 10,000,000, more preferably from 100,000 to 9,000,000, and even more preferably from 150,000 to 8,000,000. By setting the Mw of the multi-component copolymer to at least 10,000, a standard strength for golf ball materials can be fully ensured; by setting Mw to 10,000,000 or less, a high workability can be maintained. The above weight-average molecular weight and molecular weight distribution are determined by gel permeation chromatography (GPC) using polystyrene as the reference material.

The chain structure of the multi-component copolymer is not particularly limited and may be suitably selected according to the intended purpose. For example, letting the conjugated diene units be A, the non-conjugated olefin units be B and the aromatic vinyl units be C, the copolymer may be a block copolymer having an Ax-By-Cz (wherein x, y and z are integers of 1 or more) construction, a random copolymer with a construction in which A, B and C are randomly arranged, a tapered copolymer in which a random copolymer and a block copolymer are intermingled, or an alternating copolymer with an (A-B-C)w (wherein w is an integer of 1 or more) construction. The multi-component copolymer may have a structure in which the conjugated diene units, non-conjugated olefin units and aromatic vinyl units are linearly connected (linear structure), or may have a structure in which at least the conjugated diene units, the non-conjugated olefin units or the aromatic vinyl units are connected so as to form a branched chain (branched structure). In cases where the multi-component copolymer has a branched structure, the branched chain may be made a binary or multi-component chain (i.e., the branched chain may include at least two from among the conjugated diene units, non-conjugated olefin units and aromatic vinyl units). Therefore, even among multi-component copolymers, a multi-component copolymer with a branched structure having a binary or multi-component branched chain can be clearly distinguished from a conventional graft copolymer in which the main chain and the side chains are each formed of one differing type of unit.

The multi-component copolymer production method, polymerization steps and production conditions such as the polymerization catalyst used may be as described in the specification of JP No. 6780827. It is preferable for the multi-component copolymer to be one polymerized by means of a gadolinium metallocene complex catalyst.

When component (II) is an olefin-unsaturated carboxylic acid binary copolymer, the number of carbons on the olefin is preferably at least 2, and is preferably not more than 8, and more preferably not more than 6. Examples of such olefins include ethylene, propylene, butene, pentene, hexene, heptene and octene. The use of ethylene is especially preferred. Examples of unsaturated carboxylic acids of 3 to 8 carbon atoms include acrylic acid, methacrylic acid, 3,3-dimethylacrylic acid, ethacrylic acid, maleic acid, maleic anhydride and fumaric acid. The use of acrylic acid and methacrylic acid is especially preferred.

When component (II) is an olefin-unsaturated carboxylic acid-unsaturated carboxylic acid ester ternary copolymer, the olefin and the unsaturated carboxylic acid are exemplified in the same way as for the olefin-unsaturated carboxylic acid binary copolymer described above. Preferred use can be made of lower alkyl esters of the above unsaturated carboxylic acids as the unsaturated carboxylic acid ester. Specific examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred.

In component (II), the olefin-unsaturated carboxylic acid copolymer (binary copolymer) or metal salt thereof and the olefin-unsaturated carboxylic acid-unsaturated carboxylic acid ester copolymer (ternary copolymer) or metal salt thereof can be used together. That is, when the binary copolymer or a metal salt thereof (a) and the ternary copolymer or a metal salt thereof (b) are used together, they are preferably blended such that the weight ratio (a):(b)=0:100 to 80:20. When (a) is included in an amount higher that this range, a sufficient rebound resilience may not be obtainable.

When a metal neutralization product, i.e., an ionomer, is used as component (II), the type of metal neutralization product and the degree of neutralization are not particularly limited. Specific examples include a 60 mol % Zn (degree of zinc neutralization) ethylene-methacrylic acid copolymer, a 40 mol % Mg (degree of magnesium neutralization) ethylene-methacrylic acid copolymer and a 40 mol % Mg (degree of magnesium neutralization) ethylene-methacrylic acid-isobutylene acrylate ternary copolymer.

Specific examples of commercial products that may be used as component (I) include Himilan® and Nucrel™ grade products (both from Dow-Mitsui Polychemicals Co., Ltd.) and Escor™ grade products (ExxonMobil Chemical).

The content of component (II) is not particularly limited, although the component (II) content with respect to the combined amount of components (I) and (II) is preferably from 5 to 95 wt %, and more preferably from 20 to 80 wt %.

Various additives may be optionally included in the golf ball material of the invention. For example, pigments, dispersants, antioxidants, light stabilizers, ultraviolet absorbers and internal mold lubricants may be suitably included.

The golf ball material of the invention can be obtained by mixing together the above ingredients using various mixing apparatuses such as a kneading-type single-screw or twin-screw extruder, a Banbury mixer or a kneader.

The rebound resilience of the golf ball material of the invention, measured in accordance with JIS-K 6255, is preferably at least 45%, and more preferably at least 49%. When the rebound resilience is too small, a decrease in the initial velocity of the ball on approach shots can be achieved, although the distance on driver shots decreases markedly.

The golf ball material has a material hardness on the Shore D scale which, from the standpoint of the spin performance and soft feel that can be obtained in golf balls made using the material, is preferably at least 25, and more preferably at least 35, and has an upper limit of preferably not more than 75, more preferably not more than 65, and even more preferably not more than 60.

The golf ball material of the invention may be used in particular as the cover material in two-piece solid golf balls made of a core and a cover encasing the core, or as the cover materials (intermediate layer and outermost layer) in multi-piece solid golf balls made of a core of one or more layer and a multilayer cover encasing the core.

The constituent members of a golf ball in which the golf ball material of the invention is used are described below.

The core may be formed using a known rubber material as the base. A known rubber such as a natural rubber or a synthetic rubber may be used as the base rubber. More specifically, the use of primarily polybutadiene, especially cis-1,4-polybutadiene having a cis structure content of at least 40%, is recommended. Where desired, natural rubber, polyisoprene rubber, styrene-butadiene rubber or the like may be used together with the above polybutadiene in the base rubber.

The polybutadiene used may be one synthesized with a rare-earth catalyst such as a neodymium catalyst or with a metal catalyst such as a cobalt catalyst or nickel catalyst.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be included in the base rubber. Where necessary, commercial antioxidants and the like may also be suitably added.

The core diameter is suitably selected according to the ball structure. Although not particularly limited, the core diameter is preferably at least 20 mm, more preferably at least 25 mm, and even more preferably at least 30 mm. The upper limit is preferably not more than 41 mm, and more preferably not more than 40 mm.

An intermediate layer may be provided between the core and the cover outermost layer. In this case, the intermediate layer has a material hardness on the Shore D scale which, although not particularly limited, may be set to typically at least 50, preferably at least 55, and more preferably at least 60. The material hardness is preferably not more than 70, and more preferably not more than 65.

The outermost layer of the cover has a thickness which, although not particularly limited, is preferably at least 0.3 mm, more preferably at least 0.4 mm, and even more preferably at least 0.5 mm. The thickness is preferably not more than 1.2 mm, more preferably not more than 1.0 mm, and even more preferably not more than 0.8 mm.

Numerous dimples of one or more type may be formed on the surface of the cover. Also, various types of coatings may be applied to the cover surface. Because the coating must be capable of enduring the harsh conditions of golf ball use, a two-part curable urethane coating, especially a non-yellowing urethane coating, is preferred.

The method used to obtain the cover may be, for example, a method in which, depending on the type of ball being produced, a pre-fabricated single-layer core or multilayer core of two or more layers is placed in a mold and the above mixture is mixed and melted under heating and then injection-molded over the core, thereby encasing the core with the desired cover. In this case, cover production can be carried out in a state where excellent thermal stability, flowability and moldability are ensured, as a result of which the golf ball ultimately obtained has a high rebound and also a good feel at impact. Another method that may be used to form the cover involves molding the cover material beforehand into a pair of hemispherical half-cups, enclosing the core with these half-cups, and then molding under applied pressure at between 120° C. and 170° C. for 1 to 5 minutes.

EXAMPLES

The following Examples and Comparative Examples are provided to illustrate the invention, and are not intended to limit the scope thereof.

Examples 1 to 7, Comparative Examples 1 to 8

Solid cores having a diameter of 38.7 mm are produced for each Example by using the rubber composition composed primarily of polybutadiene that is shown in Table 1 and common to all the Examples and Comparative Examples, and vulcanizing at 152° C. for 19 minutes.

TABLE 1

| Core composition (amounts in pbw) | Common to all Examples |
|---|---|
| Polybutadiene | 100 |
| Zinc acrylate | 39.6 |
| Organic peroxide | 1.0 |
| Antioxidant | 0.1 |
| Zinc oxide | 15.0 |
| Zinc salt of pentachlorotbiophenol | 0.7 |
| Zinc dimethacrylate | 1.0 |
| Water | 0.6 |

Details on the above core materials are given below.
Polybutadiene: Available under the trade name "BR51" from JSR Corporation.
Zinc acrylate: "ZN-DA85S" from Nippon Shokubai Co., Ltd.
Organic peroxide: Dicumyl peroxide, available as Percumyl® D from NOF Corporation
Antioxidant: Available under the trade name "Nocrac NS6" from Ouchi Shinko Chemical Industry Co., Ltd.
Zinc oxide: Available as "Grade 3 Zinc Oxide" from Sakai Chemical Co., Ltd.
Zinc salt of pentachlorothiophenol: Available from Wako Pure Chemical Industries, Ltd.
Zinc dimethacrylate: Available from Wako Pure Chemical Industries, Ltd.
Water: Pure water (from Seiki Chemical Industrial Co., Ltd.)

Formation of Cover Layers (Intermediate Layer and Outermost Layer):

Next, the resin composition shown in Table 2 below is injection-molded over the core obtained as described above, thereby producing an intermediate layer-encased sphere composed of the core encased by an intermediate layer having a thickness of 1.2 mm and a Shore D hardness of 66.

TABLE 2

| Resin composition (amounts in pbw) | Common to all Examples |
|---|---|
| AM7318 | 85 |
| Himilan ® 1706 | 15 |
| Trimethylolpropane | 1.1 |

Details on the ingredients in the table are given below.
AM7318: An ionomer resin available from Dow-Mitsui Polychemicals Co., Ltd.

Himilan® 1706: An ionomer resin available from Dow-Mitsui Polychemicals Co., Ltd.

Trimethylolpropane: Available from Tokyo Chemical Industry Co., Ltd.

The resin compositions shown in Tables 3 and 4 below are then kneaded in a Labo Plastomill at 160° C. for 30 minutes, following which they are injection-molded over the intermediate layer-encased spheres, thereby producing spheres encased by an outermost layer having a thickness of 0.8 mm (three-piece golf balls). Dimples common to all the Examples and Comparative Examples are formed at this time on the cover surface.

Details on the materials in Tables 3 and 4 are given below.

AM7318: An ionomer resin from Dow-Mitsui Polychemicals Co., Ltd.

AN4319: Nucrel™, from Dow-Mitsui Polychemicals Co., Ltd.

HPF 2000: from The Dow Chemical Company

SEBS: "S.O.E. S1606" from Asahi Kasei Corporation

Multi-component copolymer A: see below for details

Multi-component copolymer B: see below for details

Multi-Component Copolymer A:

Eighty grams of styrene and 600 mL of toluene are added to a thoroughly dried 1,000 mL stainless steel pressure reactor.

Within a glovebox under a nitrogen atmosphere, a glass vessel is charged with 0.25 mmol of mono(bis(1,3-tert-butyldimethylsilyl)indenyl) bis(bis(dimethylsilyl)amido)gadolinium complex $(1,3\text{-}[(t\text{-}Bu)Me_2Si]_2C_9H_5Gd[N(SiHMe_2)_2]_2)$, 0.275 mmol of dimethylanilinium tetrakis(pentafluorophenyl)borate $(Me_2NHPhB(C_6F_5)_4)$ and 1.1 mmol of diisobutylaluminum hydride, and 40 mL of toluene is added to give a catalyst solution.

This catalyst solution is added to the stainless steel pressure reactor and the system is heated to 70° C.

Ethylene is then introduced under a pressure of 1.5 MPa into the stainless steel pressure reactor, in addition to which 80 mL of a toluene solution containing 20 g of 1,3-butadiene is introduced into the reactor over a period of 8 hours and copolymerization is carried out at 70° C. for a total of 8.5 hours.

Next, 1 mL of a 5 wt % isopropanol solution of 2,2'-methylenebis(4-ethyl-6-t-butylphenol) (NS-5) is added to the stainless steel pressure reactor, stopping the reaction.

The copolymer is then separated off using a large amount of methanol and vacuum-dried at 50° C., giving Copolymer A.

Multi-Component Copolymer B:

Ninety-five grams of styrene and 400 mL of toluene are added to a thoroughly dried 1,000 mL stainless steel pressure reactor.

Within a glovebox under a nitrogen atmosphere, a glass vessel is charged with 0.17 mmol of mono(bis(1,3-tert-butyldimethylsilyl)indenyl) bis(bis(dimethylsilyl)amido)gadolinium complex $(1,3\text{-}[(t\text{-}Bu)Me_2Si]_2C_9H_5Gd[N(SiHMe_2)_2]_2)$, 0.187 mmol of dimethylanilinium tetrakis(pentafluorophenyl)borate $(Me_2NHPhB(C_6F_5)_4)$ and 1.4 mmol of diisobutylaluminum hydride, and 40 mL of toluene is added to give a catalyst solution. This catalyst solution is added to the stainless steel pressure reactor and the system is heated to 70° C.

Ethylene is then introduced under a pressure of 1.5 MPa into the stainless steel pressure reactor, in addition to which 150 mL of a toluene solution containing 27 g of 1,3-butadiene is introduced into the reactor over a period of 30 minutes and copolymerization is carried out at 70° C. for 6 hours. Next, 150 mL of a toluene solution containing 27 g of 1,3-butadiene is introduced into the reactor over a period of 30 minutes and copolymerization is additionally carried out at 70° C. for 1 hour.

One milliliter of a 5 wt % isopropanol solution of 2,2'-methylenebis(4-ethyl-6-t-butylphenol) (NS-5) is then added to the stainless steel pressure reactor, stopping the reaction.

Next, the copolymer is separated off using a large amount of methanol and vacuum-dried at 50° C., giving Copolymer B.

The butadiene, ethylene and styrene contents (wt %) of Multi-Component Copolymer A and Multi-Component Copolymer B are measured and evaluated as follows.

Butadiene, Ethylene and Styrene Contents:

The butadiene, ethylene and styrene contents of each copolymer are determined by $^1$H-NMR measurement. The results are given below.

Multi-Component Copolymer A: butadiene/ethylene/styrene=14/70/16 (wt %); weight-average molecular weight (Mw), $273 \times 10^3$ Multi-Component Copolymer B: butadiene/ethylene/styrene=32/49/19 (wt %); weight-average molecular weight (Mw), $375 \times 10^3$ The material hardnesses and rebound resiliences of the cover in the above three-piece golf balls are measured as described below, giving the results shown in Tables 3 and 4 below.

Material Hardness of Cover (Shore D Hardness):

The cover-forming resin material was formed into 2 mm-thick sheets and left to stand for at least two weeks, following which the Shore D hardness was measured in accordance with ASTM D2240-95.

Rebound Resilience:

The resin material was formed into 2 mm-thick sheets with a press, stacked to a thickness of 4 mm and temperature-conditioned to 23±1° C., following which measurement was carried out according to JIS-K 6255 (2013) using a tripsometer (the rebound resilience was measured after setting the angle of impact in JIS-K 6255 to 30 degrees).

TABLE 3

| Resin material | Example | | | | | Comparative Example | | | | |
|---|---|---|---|---|---|---|---|---|---|---|
| (pbw) | 1 | 2 | 3 | 4 | 5 | 1 | 2 | 3 | 4 | 5 |
| Multi-Component Copolymer A | 20 | 50 | 80 | | | | | | | |
| Multi-Component Copolymer B | | | | 20 | 50 | | | | | |
| AM7318 | | | | | | | | | | |
| AN4319 | | | | | | 50 | | | | |
| HPF2000 | 80 | 50 | 20 | 80 | 50 | 50 | 80 | 50 | 100 | |
| SEBS | | | | | | | 20 | 50 | | 100 |
| Material hardness (Shore D) | 46 | 40 | 34 | 45 | 38 | 47 | 45 | 37 | 50 | 24 |
| Rebound resilience (%) | 66.2 | 66.5 | 66.8 | 68.6 | 64.8 | 57.5 | 57.8 | 45.5 | 69.1 | 25.0 |

TABLE 4

| Resin materials (pbw) | Example | | Comparative Example | | |
|---|---|---|---|---|---|
| | 6 | 7 | 6 | 7 | 8 |
| Multi-Component Copolymer A | 20 | 50 | | | |
| Multi-Component Copolymer B | | | | | |
| AM7318 | 80 | 50 | 100 | | 50 |
| AN4319 | | | | 100 | 50 |
| HPF2000 | | | | | |
| SEBS | | | | | |
| Material hardness (Shore D) | 60 | 54 | 66 | 30 | 48 |
| Rebound resilience (%) | 49.5 | 54.0 | 48.3 | 49.3 | 48.8 |

Figure 2:
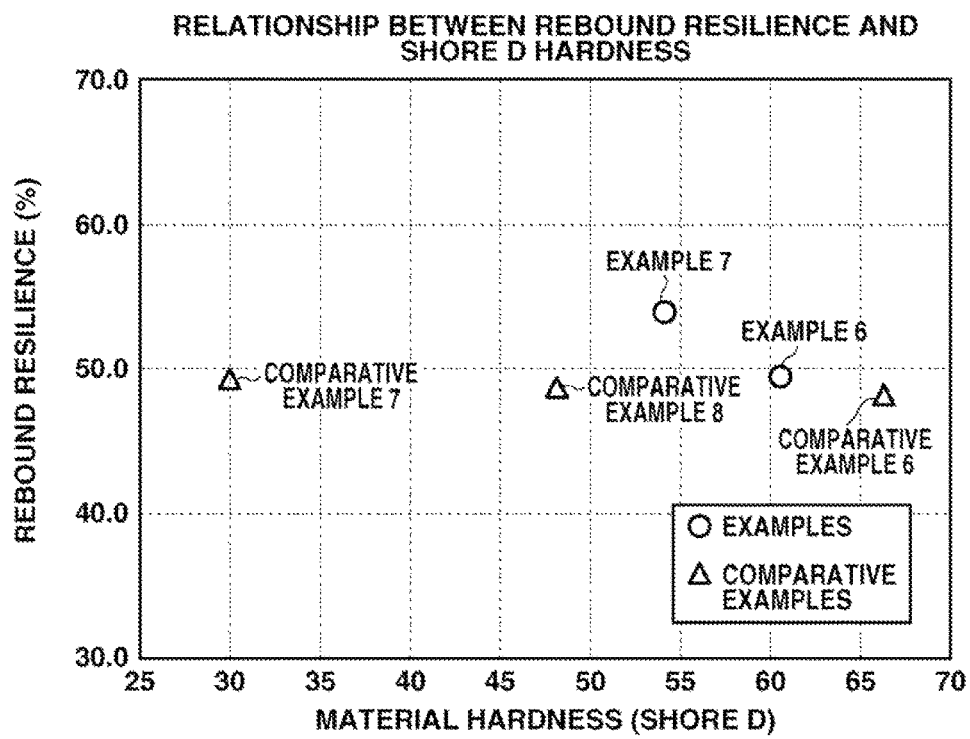
FIG. 2 is a graph showing the relationship between the material hardness and the rebound resilience of the cover in Examples 6 and 7 and Comparative Examples 6 to 8.

FIG. 1 presents a graph showing the relationship between the material hardness and the rebound resilience of the cover in Examples 1 to 5 and Comparative Examples 1 to 5 of Table 3. FIG. 2 presents a graph showing the relationship between the material hardness and the rebound resilience of the cover in Examples 6 and 7 and Comparative Examples 6 to 8 of Table 4.

From FIGS. 1 and 2, when the material hardness is the same in an Example of the invention and a Comparative Example, the rebound resilience is higher in the Example of the invention than in the Comparative Example.

Japanese Patent Application No. 2021-070462 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball having a core of one or more layer and a cover of one or more layer encasing the core, wherein at least one layer of the cover is formed of the material comprising:

(I) a multi-component copolymer having conjugated diene units, non-conjugated olefin units and aromatic vinyl units; and (II) a binary copolymer of an olefin and an $\alpha,\beta$-unsaturated carboxylic acid of 3 to 8 carbon atoms or a ternary copolymer of an olefin, an $\alpha,\beta$-unsaturated carboxylic acid of 3 to 8 carbon atoms and an ester of the $\alpha,\beta$-unsaturated carboxylic acid or both, or a metal neutralization product thereof, wherein the conjugated diene units include butadiene units, the non-conjugated olefin units include units selected from the group consisting of ethylene, propylene and 1-butene units, the aromatic vinyl units include styrene units, and the content of the conjugated diene units in the multi-component copolymer (I) is 5 wt % or more.

2. The golf ball of claim 1, wherein the content of the conjugated diene units in the multi-component copolymer (I) is 10 wt % or more.

3. The golf ball of claim 1, wherein the content of the non-conjugated olefin units in the multi-component copolymer (I) is 90 wt % or less.

4. The golf ball of claim 1, wherein the content of the aromatic vinyl units in the multi-component copolymer (I) is 30 wt % or less.

5. The golf ball of claim 1, wherein the non-conjugated olefin units are ethylene units.

6. The golf ball of claim 1, wherein the multi-component copolymer (I) is a copolymer polymerized with a gadolinium metallocene complex catalyst.

7. The golf ball of claim 1, wherein the content of component (II) relative to the combined amount of components (I) and (II) is from 5 to 95 wt %.

8. The golf ball of claim 1, wherein the material has a hardness on the Shore D scale of from 25 to 65.

* * * * *